United States Patent [19]

Ueno et al.

[11] Patent Number: 4,485,186

[45] Date of Patent: Nov. 27, 1984

[54] CATALYST COMPONENT FOR POLYMERIZATION OF OLEFINS

[75] Inventors: Hiroshi Ueno; Tadanao Kohara; Takeshi Nomura; Kouji Maruyama; Naomi Inaba; Makota Yoda, all of Saitama, Japan

[73] Assignee: Toa Nenryo Kogyo Kabushiki Kaisha, Tokyo, Japan

[21] Appl. No.: 418,500

[22] Filed: Sep. 15, 1982

[30] Foreign Application Priority Data

Sep. 29, 1981 [JP] Japan ................................ 56-152993

[51] Int. Cl.$^3$ ............................................... C08F 4/64
[52] U.S. Cl. .................................... 502/128; 502/105; 502/134; 526/124; 526/125
[58] Field of Search .................... 252/429 B, 429 C; 502/128, 105, 134

[56] References Cited

U.S. PATENT DOCUMENTS

| | | | |
|---|---|---|---|
| 3,094,568 | 6/1963 | Hay et al. | 252/429 B X |
| 3,644,318 | 2/1972 | Diedrich et al. | 260/88.2 |
| 4,144,390 | 3/1979 | Derroitte et al. | 526/125 |
| 4,209,601 | 6/1980 | Kuroda et al. | 526/114 |
| 4,224,183 | 9/1980 | Staiger | 252/429 B |
| 4,240,929 | 12/1980 | Dietz et al. | 252/429 B |
| 4,347,161 | 8/1982 | Dietz et al. | 252/429 B |
| 4,362,648 | 12/1982 | Dietz et al. | 252/429 B |

*Primary Examiner*—Patrick Garvin
*Attorney, Agent, or Firm*—M. B. Kurtzman

[57] ABSTRACT

A catalyst component for polymerization of olefins which is prepared by bringing a magnesium alkoxide, a halogenated hydrocarbon, and a titanium compound into contact with one another. The catalyst component together with a organoaluminum cocatalyst is used for the polymerization of olefins and especially for the homopolymerization of ethylene and copolymerization of ethylene with an α-olefin having from 3 to 10 carbon atoms.

21 Claims, No Drawings

CATALYST COMPONENT FOR POLYMERIZATION OF OLEFINS

FIELD OF THE INVENTION

This invention relates to catalyst components for polymerization of olefins and method of polymerizing olefins employing said catalyst components. More particularly, the invention relates to catalyst components which exhibit excellent activity resulting in high yields of high bulk density olefin homopolymers or copolymers.

DESCRIPTION OF THE PRIOR ART

Catalyst components containing a titanium compound have been usefully employed as catalysts for the homopolymerization of olefins such as ethylene and for the copolymerization of ethylene and α-olefins. In order to increase the activity of such catalysts or to improve the catalytic efficiency per unit weight of titanium in the catalysts, attempts have been made to bring the titanium compound into contact with a treated metal compound such as a magnesium compound.

For instance, there is disclosed a process of reacting an oxygen-containing magnesium compound and a halogenating agent and subsequently bringing the reaction product into contact with a titanium halide (U.S. Pat. No. 4,144,390); a process of copulverizing a hydroxyl group-containing magnesium compound and a magnesium alkoxide and subsequently bringing the resulting mixture into contact with a titanium halide (U.S. Pat. No. 3,644,318; a process of copulverizing a magnesium halide, a boron alkoxide, and a titanium halide (U.S. Pat. No. 4,209,601); and a process of copulverizing a magnesium halide and a titanium compound and subsequently reacting the reaction product with a titanium tetrahalide (Japanese Patent Laid-Open No. 151001/1980).

The catalyst components obtained by these processes provide good catalytic activity when used as polymerization catalysts in combination with a cocatalyst; however, they evidence such disadvantages as: (1) the resulting polymers have a low bulk density and the productivity of the polymerization unit is decreased, (2) catalytic activity decreases considerably during polymerization over a long time, (3) the effect of molecular weight control is small when small amounts of hydrogen are used as a molecular weight modifier; high hydrogen pressure or high polymerization temperature being required to increase the melt index of the resulting polymer, and (4) the reactivity with an olefin as a comonomer in copolymerization is low, therefore, high comonomer concentration is required.

SUMMARY OF THE INVENTION

In accordance with this invention, it has been discovered that the above described disadvantages are overcome by employing a catalyst component for the homo- or copolymerization of olefins, said catalyst component obtained by contacting a magnesium hydrocarbyloxide and a halogenated hydrocarbon with each other and subsequently contacting the resulting mixture with a titanium compound or simultaneously contacting the magnesium hydrocarbyloxide, halogenated hydrocarbon and titanium compound.

In co-pending application Ser. No. 418,499 filed concurrently herewith there is disclosed mechanically copulverizing magnesium halide and magnesium hydrocarbyloxide and thereafter contacting the product with tetravalent titanium halide in the presence of a hydrocarbon or a halogenated hydrocarbon.

The magnesium hydrocarbyloxide used in this invention is represented by the formula $Mg(OR)(OR')$, wherein R and R' are alkyl, alkenyl, cycloalkyl, aryl, and aralkyl groups having 1 to 20, preferably 1 to 10 carbon atoms, and R and R' may be the same or different.

Illustrative, but non-limiting examples of such compounds are $Mg(OCH_3)_2$, $Mg(OC_2H_5)_2$, $Mg(OCH_3)(OC_2H_5)$, $Mg(Oi\text{-}C_3H_7)_2$, $Mg(OC_3H_7)_2$, $Mg(OC_4H_9)_2$, $Mg(Oi\text{-}C_4H_9)_2$, $Mg(OC_4H_9)(Oi\text{-}C_4H_9)$, $Mg(OC_4H_9)(O\text{-}sec\text{-}C_4H_9)$, $Mg(OC_6H_{13})_2$, $Mg(OC_8H_{17})_2$, $Mg(OC_6H_{11})_2$, $Mg(OC_6H_5)_2$, $Mg(OC_6H_4CH_3)_2$, and $Mg(OCH_2C_6H_5)_2$.

These magnesium compounds should be dried, preferably heat-dried in vacuo, before use. It is especially preferable to use a magnesium alkoxide which has been pulverized after drying.

The halogenated hydrocarbon used in this invention is a mono- or polyhalogen substituted compound of a saturated or unsaturated aliphatic, alicyclic, or aromatic hydrocarbon having 1 to 12 carbon atoms. Examples of such compounds include halogenated aliphatic compounds such as methyl chloride, methyl bromide, methyl iodide, methylene chloride, methylene bromide, methylene iodide, chloroform, bromoform, iodoform, carbon tetrachloride, carbon tetrabromide, carbon tetraiodide, ethyl chloride, ethyl bromide, ethyl iodide, 1,2-dichloroethane, 1,2-dibromoethane, 1,2-diiodoethane, methylchloroform, methylbromoform, methyliodoform, 1,1,2-trichloroethylene, 1,1,2-tribromoethylene, 1,1,2,2-tetrachloroethylene, pentachloroethane, hexachloroethane, hexabromoethane, n-propylchloride, 1,2-dichloropropane, hexachloropropylene, octachloropropane, decabromobutane, and chlorinated paraffin; alicyclic compounds such as chlorocyclopropane, tetrachlorocyclopentane, hexachlorocyclopentane, and hexachlorocyclohexane; and aromatic compounds such as chlorobenzene, bromobenzene, o-dichlorobenzene, p-dichlorobenzene, hexachlorobenzene, hexabromobenzene, benzotrichloride, and p-chlorobenzotrichloride. These halogenated hydrocarbons can be used individually or in mixture.

The titanium compound which can be employed in this invention is a divalent, trivalent, or tetravalent titanium compound represented by the formula $Ti^n(OR'')_x(X)_y$, wherein R'' is an alkyl or aryl group having from 1 to 6 carbon atoms, X is chloride or bromide, n is 2, 3, or 4 and the sum of $x+y=n$. Illustrative but non-limiting examples of such a titanium compound include titanium tetrachloride, titanium tetrabromide, trichloroethoxytitanium, trichlorobutoxytitanium, dichlorodiethoxytitanium, dichlorodibutoxytitanium, dichlorodiphenoytitanium, chlorotriethoxytitanium, chlorotributoxytitanium, tetrabutoxytitanium, and titanium trichloride. The preferred titanium compounds are tetravalent titanium compounds such as titanium tetrachloride, trichloroethoxytitanium, dichlorodibutoxytitanium, and dichlorodiphenoxytitanium. Titanium tetrachloride is particularly preferred.

The catalyst component of this invention is obtained by bringing a magnesium alkoxide, a halogenated hydrocarbon, and a titanium compound into contact with one another. Such contact is accomplished by any one of the following two methods. (1) A magnesium alkoxide and a halogenated hydrocarbon are brought into contact with each other and then the resulting mixture is brought into contact with a titanium compound. (2) A magnesium alkoxide, a halogenated hydrocarbon, and a titanium compound are simultaneously brought into contact with one another.

DESCRIPTION OF THE INVENTION

Contact of magnesium alkoxide and halogenated hydrocarbon in accordance with Method (1) mentioned above is accomplished by mechanically copulverizing or by simply stirring a solid or slurry mixture of a magnesium alkoxide and a solid or liquid halogenated hydrocarbon. Mechanical copulverization is preferred.

Any one of the above-mentioned halogenated hydrocarbons may be used for this purpose, however, polyhalogenated hydrocarbons having two or more carbon atoms are preferred. Examples of such compounds include 1,2-dichloroethane, 1,1,1-trichloroethane, 1,1,2-trichloroethylene, 1,1,2,2-tetrachloroethane, 1,2,2,2-tetrachloroethane, pentachloroethane, hexachloroethane, 1,2-dichloropropane, hexachloropropylene, octachloropropane, and hexachlorobenzene.

The magnesium alkoxide and halogenated hydrocarbon are brought into contact at a ratio of 1 mol for the former and about 0.01 to about 20 mol, preferably about 0.1 to about 2.0 mol for the latter.

Contact by copulverization of the two compounds is effected mechanically with a common pulverizer such as rotary ball mill, vibrating ball mill or impact mill. Copulverization may be accomplished, as required, under reduced pressure or in an inert gas atmosphere in the substantial absence of moisture and oxygen.

The contacting be either simple stirring or mechanical copulverization is desirably performed at about 0° to about 200° C. for about 0.5 to about 100 hours.

The magnesium alkoxide can also be brought into contact with a magnesium halide before being brought into contact with a halogenated hydrocarbon.

Preferable magnesium halides are magnesium chloride, magnesium bromide, and magnesium iodide; magnesium chloride being particularly preferred.

The magnesium halides preferably have an average particle diameter from 1 to 50 microns for the convenience of use, however, a greater particle diameter can also be used.

The magnesium halides should preferably be anhydrides which contain substantially no water of crystallization. Therefore, it is preferable that prior to their use commercial products be heat-treated at 200° to 600° C. in the presence of nitrogen or an inert gas or at 100° to 400° C. in vacuo. Such heat treatment, however, may be omitted.

The contact of a magnesium alkoxide and a magnesium halide may be accomplished by mixing the stirring or by mechanically copulverizing both in the presence or absence of an inert hydrocarbon.

Illustrative but non-limiting examples of such inert hydrocarbons include hexane, heptane, octane, cyclohexane, benzene, toluene, and xylene.

The magnesium alkoxide and the magnesium halide should be brouht into contact with each other at a ratio of 1 mol for the former to about 0.1 to about 10 mol, preferably about 0.3 to about 2.0 mol of the latter. In the case where contact is accomplished in the presence of an inert hydrocarbon, the hydrocarbon should preferably be used in an amount of from about 1 to about 100 g for 100 g of the magnesium alkoxide and magnesium halide in total.

The contact of the magnesium alkoxide and the magnesium halide should preferably be performed at room temperature to about 200° C. for 0.1 to about 100 hours in the case of mechanical copulverization and at room temperature to 200° C. for 1 to 100 hours in the case of mixing and stirring in the presence of the hydrocarbon. Mechanical copulverization is particularly preferred among the above-mentioned methods for contact. The mechanical copulverization may be accomplished in the same way as in the above-mentioned mechanical copulverization for the magnesium alkoxide and the halogenated hydrocarbon.

The magnesium alkoxide which has been previously treated with a magnesium halide as mentioned above is brought into contact with a halogenated hydrocarbon as mentioned above. In this case, a halide of a hydrocarbon having one carbon atom can be used as a matter of course.

It is also possible to bring a magnesium alkoxide, a magnesium halide, and a halogenated into contact with one another all at once.

The product (referred to as the contact product hereinafter) resulting from contacting the magnesium alkoxide and halogenated hydrocarbon is then brought into contact with a titanium compound to obtain the catalyst component of this invention. The contact product may be washed with a washing agent such as the above-mentioned inert hydrocarbon before contact with a titanium compound, however washing is not necessary.

Contact of the contact product and a titanium compound may be accomplished by simply bringing them into contact with each other. However, contact is preferably accomplished by mixing and stirring both or by mechanically copulverizing both in the presence of a hydrocarbon and/or halogenated hydrocarbon.

Preferred hydrocarbons include saturated aliphatic, saturated alicyclic, and aromatic hydrocarbons such as hexane, heptane, octane, cyclohexane, benzene, toluene, and xylene. Any of the halogenated hydrocarbons which are contacted with the above-mentioned magnesium alkoxide can be employed during this copulverizing step.

The contact product and a titanium compound are brought into contact with each other at a ratio of 1 gram-atom of magnesium in the former to 0.1 gram mol or more, desirably about 0.1 to about 20 gram mol and preferably 1 to 5 gram mol of the latter.

Contact should be performed at about 0° to about 200° C. for about 0.5 to about 20 hours, and preferably at about 60° to about 150° C. for about 1 to about 5 hours in the presence of a hydrocarbon and/or halogenated hydrocarbon.

The hydrocarbon and/or halogenated hydrocarbon should preferably be used in an amount of about 10 to about 300 g for 1 liter of the contact product in the form of liquid (hydrocarbon and/or liquid halogenated hydrocarbon and liquid titanium compound).

The simultaneous contacting of the magnesium alkoxide, halogenated hydrocarbon, and titanium compound in accordance with Method (2) mentioned above is accomplished by mechanically pulverizing them or by mixing and stirring them in the presence or absence of an inert hydrocarbon such as hexane, heptane, octane, cyclohexane, benzene, toluene, xylene, or the like.

The magnesium alkoxide, halogenated hydrocarbon, and titanium compound may be used in the same ratio as in Method (1) described above. In other words, the halogenated hydrocarbon in an amount of about 0.01 to about 20 mol, preferably about 0.1 to about 2.0 mol, the titanium compound in an amount of about 0.1 mol and more, preferably from about 1 to about 5 mol, for 1 mol of the magnesium alkoxide.

The contact temperature is 0° to 200° C., preferably 20° to 150° C., and the contact time is 0.5 to 100 hours, preferably 1 to 50 hours.

In the case of contact in the presence of a hydrocarbon, the hydrocarbon should be used in such an amount that the solid substance in the contact system is 10 to about 300 g in 1 liter of the liquid substance.

The solid substance obtained in the above manner is then separated from the liquid and, if required, washed with an inert hydrocarbon such as hexane, heptane, octane, cyclohexane, benzene, toluene, and xylene, and finally dried to give the catalyst component of this invention.

The catalyst component of this invention has a specific surface area of about 200 to about 650 m$^2$/g as measured by BET method at the adsorption temperature of liquid nitrogen, a pore volume of about 0.1 to about 0.4 cc/g, and a pore radius of about 10 to about 13 Å. The particle size distribution is narrow and the size is uniform. The composition is 10 to 20 wt% magnesium, 5 to 15 wt% of titanium, and 50 to 65 wt% of halogen, with the remainder being organic compounds. The substance contains a small quantity of halogenated hydrocarbon and/or converted substance thereof used in the preparation of the catalyst component.

Catalyst for Polymerization of Olefins:

In accordance with another aspect of this invention, a catalyst for homopolymerization of olefins or for copolymerization of olefins, preferably ethylene and an α-olefin is provided. The catalyst comprises the catalyst component of this invention and an organoaluminum compound.

Organoaluminum Compound

The organoaluminum compound to be combined with the catalyst component for polymerization of olefins is represented by the formula $R'''_nAlX_{3-n}$, wherein $R'''$ is an alkyl or aryl group; X is a halogen atom, alkoxyl group, or hydrogen atom, and n is a number in the range of $1 \leq n \leq 3$. Examples of such compounds include alkyl aluminum compounds and mixtures or complex compounds thereof having 1 to 18 carbon atoms, preferably 2 to 6 carbon atoms, such as, for example, trialkyl aluminum, dialkyl aluminum monohalide, monoalkyl aluminum dihalide, alkyl aluminum sesquihalide, dialkyl aluminum monoalkoxide, and dialkyl aluminum monohalide. Illustrative of the organoaluminum compounds are trialkyl aluminums such as trimethyl aluminum, triethyl aluminum, tripropyl aluminum, triisobutyl aluminum, and trihexyaluminum; dialkyl alumnimum monohalides such as dimethyl aluminum chloride, diethyl aluminum chloride, diethyl aluminum bromide, diethyl aluminum iodide, and diiobutyl aluminum chloride; monoalkyl aluminum dihalide such as methyl aluminum dichloride, ethyl aluminum dichloride, ethyl aluminum dibromide, ethyl aluminum diiodide, and isobutyl aluminum dichloride, alkyl aluminum sesquihalide such as ethyl aluminum sesquichloride; dialkyl aluminum monoalkoxide such as dimethyl aluminum methoxide, diethyl aluminum ethoxide, diethyl aluminum phenoxide, dipropyl aluminum ethoxide, diisobutyl aluminum ethoxide, and diisobutyl aluminum phenoxide; and dialkyl aluminum hydride such as dimethyl aluminum hydride, diethyl aluminum hydride, dipropyl aluminum hydride, and diisobutyl aluminum hydride.

Preferably trialkyl aluminums are employed and particularly triethyl aluminum or triisobutyl aluminum. These trialkyl aluminum compounds may be used in combination with other organoaluminum compounds such as diethyl aluminum chloride, ethyl aluminum dichloride, ethyl aluminum sesquichloride, diethyl aluminum ethoxide, diethyl aluminum hydride, or a combination or complex compound thereof, which are readily available in commercial quantities.

The organoaluminum compounds may be used alone; however, electron donor compounds may be usefully employed with the organoaluminum compound. Illustrative examples of electon donor compounds include carboxylic acids; carboxylic acid esters; alcohols; ethers; ketones; amines; amides; nitriles; aldehydes; alcoholates; phosphorus, arsenic, or antimony compound connected to an organic group through a carbon or oxygen atom; phosphoamides, thioethers; thioesters; and carbonic esters. Preferable among them are carboxylic esters, alcohols, and ethers.

Examples of carboxylic esters include butyl formate, ethyl acetate, butyl acetate, ethyl acrylate, ethyl butyrate, isobutyl isobutyrate, methyl methacrylate, diethyl maleate, diethyl tartrate, ethyl cyclohexanecarboxylate, ethyl benzoate, ethyl p-methoxybenzoate, ethyl p-t-butylbenzoate, dibutyl phthalate, diallyl phthalate, and ethyl α-naphthoate. Preferable among them are alkyl esters of aromatic carboxylic acids, particularly, 1- to 8-carbon alkyl esters of nuclear-substituted benzoic acid such as p-methyl benzoate and p-methoxy benzoate.

The alcohols are represented by the formula ROH, where R is an alkyl, alkenyl, cycloalkyl, aryl, and aralkyl group having 1 to 12 carbon atoms. Examples of such alcohols include methanol, ethanol, propanol, isopropanol, butanol, isobutanol, pentanol, hexanol, octanol, 2-ethylhexanol, cyclohexanol, benzyl alcohol, and allyl alcohol.

The ethers are represented by the formula ROR', where R and R' are alkyl, alkenyl, cycloalkyl, aryl, and aralkyl group having 1 to 12 carbon atoms, and R and R' may be the same or different. Examples of such ethers include diethyl ether, diisopropyl ether, dibutyl ether, diisobutyl ether, diisoamyl ether, di-2-ethylhexyl ether, diallyl ether, ethyl allyl ether, butyl allyl ether, diphenyl ether, anisole, and ethyl phenyl ether. The electron donor compounds can be complexed with the organoaluminum compound prior to contact with the catalyst component, or in the alternative, the organoaluminum and the electron donor compound can be contacted with the catalyst component sequentially or simultaneously.

The organoaluminum compound is used in an amount of 1 to 2000 gram mol, preferably 20 to 500 gram mol per 1 gram-atom of titanium in the catalyst component of this invention.

The organoaluminum compound and the electron donor compound are used in a ratio of 0.1 to 40 gram-atom, preferably 1 to 25 gram-atom of aluminum to 1 mol of the electron donor compound.

Polymerization of Olefins

The catalysts of this invention, comprising a catalyst component obtained as above and an organoaluminum compound and optionally an electron donor compound, is useful for homopolymerization of a monoolefin or for copolymerization of a monoolefin and another monoolefin or a diolefin. The catalyst is particularly useful for homopolymerization of ethylene or for random or block copolymerization of ethylene and α-olefin having 3 to 10 carbon atoms such as propylene, 1-butene, 4-methyl-1-pentene, 1-hexene, and 1-octene.

The polymerization reaction may be accomplished in either gas phase or liquid phase process. The liquid phase polymerization may be performed in an inert hydrocarbon such as for example, n-butane, isobutane, n-pentane, isopentane, hexane, heptane, octane, cyclohexane, benzene, toluene, and xylene, or in the liquid monomer. The polymerization temperature is usually in the range from about $-80°$ C. to about $+150°$ C., preferably from about 40° to 120° C. The polymerization pressure can be from about 1 to about 60 atm. The molecular weight of the resulting polymer may be controlled by hydrogen or with any other known molecular weight modifier. The quantity of the olefin to be copolymerized is usually in the range of up to about 30 wt%, particularly from 0.3 to 15 wt%. The polymerization reaction using the catalyst system of this invention may be performed continuously or batchwise under the conditions which are normally employed in the polymerization art. The copolymerization may be accomplished in one stage or in two or more stages.

The catalyst component of this invention exhibits a high catalytic activity when used in combination with the organoaluminum compound and optionally an electron donor component for homopolymerization of an olefin, particularly ethylene, or for copolymerization of ethylene and other olefins. In addition, it permits effective molecular weight control by hydrogen. This is particularly true in the case where a magnesium alkoxide is previously brought into contact with a magnesium halide. Therefore, the catalyst component of this invention readily provides polymers having a high melt index and a high bulk density. The catalyst system containing the catalyst component of this invention maintains high catalytic activity even under a high hydrogen partial pressure.

EXAMPLES

The invention is described in detail with reference to the following non-limitative examples and application examples. Percent (%) used in the examples is wt%, unless otherwise specified.

The specific surface area (S.A.), pore volume (P.V.), and mean pore radius (M.P.R.) of the catalyst component were measured with SORPTOMATIC, Model 1810, (a product of CARLO ERBA). The particle size distribution of the catalyst component was measured with a phototransmission type particle size distribution meter, Model SKN 500, (a product of Seishin Kigyo Co., Ltd.).

The melt index (MI) of the resulting polymer was determined at 190° C. under a load of 2.16 kg according to ASTM D1238. The flow ratio (FR) is a quotient obtained by dividing the value (HLMI) measured at 190° C. under 2.16 L kg. It represents the ratio of the discharged quantities of a polymer, and it is also a measure expressing the molecular weight distribution of the resulting polymer. The cyclohexane soluble (CHS) which indicates the ratio of low molecular weight fractions in the resulting polymer was determined by extracting the polymer with boiling cyclohexane for 5 hours in a Soxhlet extractor of improved type.

The catalytic activity Kc is expressed by the quantity (g) of polymer formed by 1 g of the catalyst. The specific catalytic activity indicates the quantity (g) of polymer formed per 1 g of the catalyst for 1 hour of polymerization under a monomer partial pressure of 1 kg/cm².

The bulk density was determined according to ASTM D1895-69, Method A.

EXAMPLE 1

Bringing magnesium ethoxide into contact with hexachloroethane 85 g of commercial magnesium diethoxide [Mg(OEt)$_2$] and 79 g of hexachloroethane (C$_2$Cl$_6$) [the molar ratio of C$_2$Cl$_6$ to Mg(OEt)$_2$ being 0.45] were placed in a 1-liter stainless steel (SUS 32) mill pot containing 340 stainless steel (SUS 32) balls 12 mm in diameter in a nitrogen atmosphere. The mill pot was shaked on a shaker for 15 hours to give the crushed product (S-1).

Treatment with titanium tetrachloride 12 g of the crushed product (S-1) was placed in a 500-ml flask in a nitrogen gas atmosphere. To this flask were added 100 ml of toluene and 50 ml of titanium tetrachloride. Contact of the reactants was accomplished by stirring at 110° C. for 2 hours, and excess liquid was removed. Then, the solid substance was washed six times, each time with 100 ml of n-hexane at 65° C., and subsequently dried at 50° C. in vacuo for 1 hour to give 11.0 g of the catalyst component containing 10.7% of titanium, 13.4% of magnesium, and 57.1% of chlorine. This catalyst component was found to have a specific surface area of 560 m²/g, a pore volume of 0.374 cc/g, and a mean pore radius of 13.4 Å.

EXAMPLES 2 AND 3

The catalyst components of these examples were prepared in the same manner as in Example 1 except that the quantity of hexachloroethane was varied as follows when magnesium diethoxide and hexachloroethane were brought into contact with each other. The resulting catalyst components were found to have the composition and physical properties as shown in Table 1.

| Example | C$_2$Cl$_6$/Mg(OEt)$_2$ (molar ratio) |
| --- | --- |
| 2 | 0.13 |
| 3 | 0.98 |

EXAMPLES 4 AND 5

The catalyst components of these examples were prepared in the same manner as in Example 1 except that the time for contact by copulverization was changed to 5 hours (Example 4) and 25 hours (Example 5) when magnesium diethoxide and hexachloroethane were brought into contact with each other. The resulting catalyst components were found to have the composition and physical properties as shown in Table 1.

EXAMPLES 6 TO 8

The catalyst components of these examples were prepared in the same manner as in Example 1 except that the toluene which was used when the crushed product (S-1) was brought into contact with titanium tetrachloride was replaced by the following diluents. The resulting catalyst components were found to have the composition and physical properties a shown in Table 1.

| Example | Diluent |
|---|---|
| 6 | 1,2-dichloropropane |
| 7 | n-heptane |
| 8 | 1,2-dichloropropane (50 vol %)-toluene (50 vol %) |

COMPARATIVE EXAMPLE 1

The mill pot used in Example 1 was shaked for 15 hours with magnesium ethoxide alone. The resulting crushed product was brought into contact with titanium tetrachloride in the presence of toluene as in Example 1. The resulting contact product was treated as in Example 1 to give a solid substance. This solid substance was found to have the composition and physical properties as shown in Table 1.

TABLE 1

| | Physical Properties | | | Composition (%) | | |
|---|---|---|---|---|---|---|
| Example | S.A. ($m^2$/g) | P.V. (cc/g) | M.P.R. (Å) | Titanium | Magnesium | Chlorine |
| 2 | 442 | 0.280 | 12.8 | 7.7 | 11.7 | 55.6 |
| 3 | 555 | 0.322 | 11.6 | 8.4 | 13.9 | 59.2 |
| 4 | 530 | 0.319 | 11.9 | 12.7 | 13.3 | 58.6 |
| 5 | 560 | 0.331 | 11.4 | 11.9 | 13.9 | 61.8 |
| 6 | 549 | 0.339 | 12.3 | 7.6 | 12.9 | 57.1 |
| 7 | 336 | 0.203 | 13.9 | 11.9 | 13.8 | 56.9 |
| 8 | 556 | 0.341 | 12.1 | 12.1 | 13.7 | 61.1 |
| Comp. Ex. 1 | 180 | 0.158 | 15.0 | 7.8 | 11.9 | 53.8 |

EXAMPLE 9

Commercial granular magnesium ethoxide was crushed by shaking for 2 hours in a mill pot as used in Example 1. The resulting powdery magnesium diethoxide in an amount of 11.9 g was placed in a 500-ml flask together with 11.0 g of hexachloroethane dissolved in 100 ml of 1,2-dichloropropane and 50 ml of titanium tetrachloride. The reactants were stirred at 110° C. for 2 hours in a nitrogen atmosphere, and the excess liquid was removed.

The solid substance was washed six times, each time with 100 ml of n-hexane at 65° C., and subsequently dried at 50° C. for 1 hour in vacuo to give a catalyst component containing 8.1% of titanium, 15.1% of magnesium, and 56.5% of chlorine. This catalyst component was found to have a surface area of 440 $m^2$/g, a pore volume of 0.33 cc/g, and a mean pore radius of 12.3 Å.

EXAMPLE 10

Bringing magnesium diethoxide, magnesium chloride, and hexachloroethane into contact with one another 58 g of commercial magnesium diethoxide and 48 g of magnesium chloride anhydride were copulverized for 2 hours in a mill pot as used in Example 1. 32 g of hexachloroethane was added [the molar ratio of Mg(OEt)$_2$/MgCl$_2$/C$_2$Cl$_6$ being 1/1/0.24] and copulverization was performed for 15 hours to give the crushed product (S-2).

Treatment with titanium tetrachloride 11.3 g of the crushed product (S-2) was placed in a 500-ml flask in a nitrogen gas atmosphere. To this flask were added 100 ml of toluene and 50 ml of titanium tetrachloride. Contact of the reactants was accomplished by stirring at 110° C. for 2 hours, and excess liquid was removed. The solid substance was washed six times, each time with 100 ml of n-hexane at 65° C., and subsequently dried at 50° C. in vacuo for 1 hour to give the catalyst component. The composition and physical properties of the resulting catalyst component are shown in Table 2.

EXAMPLES 11 TO 13

The catalyst components were prepared in the same manner as in Example 10 except that the toluene which was used when the crushed product (S-2) was brought into contact with titanium tetrachloride was replaced by the following diluents. The resulting catalyst components were found to have the composition and physical properties as shown in Table 2.

| Example | Diluent |
|---|---|
| 11 | n-heptane |
| 12 | 1,2-dichloropropane |
| 13 | 1,2-dichloropropane (50 vol %)-toluene (50 vol %) |

EXAMPLES 14 TO 17

The catalyst components were prepared in the same manner as in Example 10 except that the molar ratios of the magnesium diethoxide, magnesium chloride, and hexachloroethane were changed as follows: The resulting four catalyst components were found to have the composition and physical properties as shown in Table 2.

| Example | Mg(OEt)$_2$/MgCl$_2$/C$_2$Cl$_6$ (molar ratio) | | |
|---|---|---|---|
| 14 | 1.0 | 0.3 | 0.15 |
| 15 | 1.0 | 0.5 | 0.24 |
| 16 | 1.0 | 0.8 | 0.24 |
| 17 | 0.8 | 1.0 | 0.4 |

TABLE 2

| | Physical Properties | | | Composition (%) | | |
|---|---|---|---|---|---|---|
| Example | S.A. ($m^2$/g) | P.V. (cc/g) | M.P.R. (Å) | Titanium | Magnesium | Chlorine |
| 10 | 388 | 0.260 | 13.4 | 9.8 | 17.3 | 56.8 |
| 11 | 343 | 0.243 | 14.1 | 5.8 | 16.9 | 59.6 |
| 12 | 392 | 0.253 | 12.8 | 4.6 | 19.1 | 57.3 |
| 13 | 412 | 0.257 | 11.9 | 6.1 | 17.5 | 56.3 |
| 14 | 440 | 0.281 | 12.7 | 9.6 | 14.9 | 59.1 |
| 15 | 432 | 0.279 | 12.5 | 9.1 | 14.8 | 58.3 |
| 16 | 395 | 0.261 | 11.3 | 7.9 | 15.9 | 59.3 |
| 17 | 343 | 0.238 | 10.8 | 5.7 | 19.3 | 57.5 |

APPLICATION EXAMPLE 1

Polymerization of Ethylene

Into a 1.5-liter stainless steel (SUS 32) autoclave equipped with a stirrer were charged in a nitrogen atomsphere 10.9 mg of the catalyst component obtained in Example 1, 0.7 mmol of triisobutyl aluminum, and 700 ml of isobutane. The polymerization system was heated to 85° C. Hydrogen was introduced into the autoclave to the extent that the partial pressure of hydrogen reached 2 kg/cm$^2$. Ethylene was introduced to the extent that the ethylene partial pressure reached 5.0 kg/cm$^2$. Ethylene was supplied continuously to carry out polymerization for 60 minutes while keeping constant the total pressure of the polymerization system. After completion of polymerization, the solvent and unreacted ethylene were purged and white powder polymer was collected. The polymer was dried at 70° C. for 10 hours in vacuo. Thus, 350 g of polyethylene powder having an MI of 1.10, an FR of 30.2, and a bulk density of 0.34 g/cc was obtained. The catalytic activity Kc was 33,240 and the specific catalytic activity was 6,650. The CHS of the polymer was 0.309%.

APPLICATION EXAMPLES 2 TO 10

Polymerization of Ethylene

Ethylene was polymerized as in Application Example 1 except that the catalyst components obtained in Examples 2 to 9 and Comparative Example 1 were used. The results are shown in Table 3.

TABLE 3

| Application Example | Catalyst Component | Catalytic Activity Kc | Specific Activity | MI | FR | Bulk Density | CHS |
|---|---|---|---|---|---|---|---|
| 2 | Ex. 2 | 22,800 | 4,560 | 0.46 | 32.5 | 0.34 | 0.28 |
| 3 | Ex. 3 | 28,000 | 5,600 | 1.15 | 31.5 | 0.33 | 0.22 |
| 4 | Ex. 4 | 23,670 | 4,730 | 0.50 | 33.1 | 0.31 | 0.24 |
| 5 | Ex. 5 | 30,930 | 6,190 | 0.31 | 39.0 | 0.36 | 0.23 |
| 6 | Ex. 6 | 33,240 | 6,650 | 1.10 | 35.7 | 0.33 | 0.31 |
| 7 | Ex. 7 | 32,280 | 6,460 | 0.88 | 31.0 | 0.32 | 0.30 |
| 8 | Ex. 8 | 31,450 | 6,290 | 0.61 | 29.0 | 0.34 | 0.28 |
| 9 | Ex. 9 | 19,800 | 3,690 | 0.47 | 31.5 | 0.34 | 0.31 |
| 10 | Comp. Ex. 1 | 4,570 | 1,310 | 0.21 | 29.1 | 0.16 | 0.36 |

APPLICATION EXAMPLE 11

Polymerization of Ethylene

Ethylene was polymerized as in Application Example 1 except that the catalyst component obtained in Example 1 was used in an amount of 12.3 mg and the partial pressure of hydrogen was kept at 10 kg/cm². Polyethylene powder was obtained in an amount of 338.3 g, which was found to have an MI of 350, a bulk density of 0.36 g/cc, and a true density of 0.971/cc. The specific catalytic activity was 5,500. the polymerization catalyst exhibited a high activity in spite of high hydrogen partial pressure.

APPLICATION EXAMPLE 12

Copolymerization of Ethylene and 1-Butene

Into the same autoclave as used in Application Example 1 were charged in a nitrogen atmosphere 11 mg of the catalyst component obtained in Example 1, 0.7 mmol of triisobutyl aluminum, and 700 ml of isobutane. The polymerization system was heated to 85° C. Hydrogen was introduced into the autoclave to the extent that the partial pressure of hydrogen reached 0.08 kg/cm². Ethylene was supplied to the extent that the partial pressure of ethylene reached 3 kg/cm², and then 5 g of 1-butene was added. Ethylene was supplied continuously to carry out polymerization for 30 minutes while keeping constant the total pressure of the polymerization system. After completion of polymerization, the same treatment as in Application Example 1 were carried out. Thus, 305.3 g of powdery ethylene-1-butene copolymer was obtained. The copolymer was found to have a bulk density of 0.35 g/cc, a true density of 0.925 g/cc, and an MI of 0.0015.

APPLICATION EXAMPLES 13 TO 20

Polymerization of Ethylene

Ethylene was polymerized as in Application Example 1 except that the catalyst components obtained in Examples 10 to 17 were used. The results are shown in Table 4.

TABLE 4

| Application Example | Catalyst Component | Catalytic Activity Kc | Specific Activity | MI | FR | Bulk Density | CHS |
|---|---|---|---|---|---|---|---|
| 13 | Ex. 10 | 27,600 | 5,520 | 1.97 | 31.5 | 0.37 | 0.28 |
| 14 | Ex. 11 | 23,700 | 4,740 | 1.06 | 32.3 | 0.35 | 0.24 |
| 15 | Ex. 12 | 18,500 | 3,700 | 1.96 | 35.1 | 0.38 | 0.28 |
| 16 | Ex. 13 | 23,500 | 4,700 | 1.35 | 34.5 | 0.35 | 0.29 |
| 17 | Ex. 14 | 22,800 | 4,560 | 0.95 | 33.5 | 0.33 | 0.29 |
| 18 | Ex. 15 | 23,900 | 4,780 | 1.05 | 35.1 | 0.34 | 0.28 |
| 19 | Ex. 16 | 21,900 | 4,380 | 1.08 | 35.5 | 0.34 | 0.28 |
| 20 | Ex. 17 | 20,500 | 4,100 | 1.10 | 34.9 | 0.35 | 0.27 |

APPLICATION EXAMPLE 21

Polymerization of Ethylene

Ethylene was polymerized as in Application Example 1 under a high hydrogen partial pressure except that the catalyst component obtained in Example 10 was used in an amount of 12.5 mg. Polyethylene powder was obtained in an amount of 256.3, which was found to have an MI of 550, a bulk density of 0.37 g/cc, and a true density of 0.970 g/cc. The specific catalytic activity was 4,100. The CHS was 6.5%; this means that the polymer contains the low molecular weight fraction in only a small quantity although the MI is high.

APPLICATION EXAMPLE 22

Copolymerization of Ethylene and 1-Butene

Ethylene and 1-butene were copolymerized as in Application Example 12 except that the catalyst component obtained in Example 10 was used in an amount of 12.1 mg. Ethylene-1-butene copolymer was obtained in an amount of 200.2 g, which was found to have a bulk density of 0.38 g/cc, a true density of 0.925 g/cc, and an MI of 0.031. The specific catalytic activity was 11,000.

What is claimed is:

1. A catalyst component for use in the polymerization of olefins which is obtained by contacting a magnesium compound represented by the formula Mg(OR)(OR'), a halogenated hydrocarbon having 2 or more carbon atoms selected from the group consisting of mono or polyhalogen substituted compound of saturated aliphatic or alicyclic hydrocarbons and a titanium compound, wherein R and R' are alkyl, alkenyl, cycloalkyl, aryl and aralkyl groups and R and R' may be the same or different.

2. The catalyst component of claim 1 wherein the magnesium compound and the halogenated hydrocarbon are contacted prior to contact with the titanium compound.

3. The catalyst component of claim 2 wherein the magnesium compound is contacted with a magnesium halide.

4. The catalyst component of claim 3 wherein the magnesium compound, magnesium halide and halogenated hydrocarbon are contacted simultaneously.

5. The catalyst component of claim 2 wherein the ratio of contacted product of magnesium and halogenated hydrocarbon to titanium compound is 1 gram atom of magnesium to 0.1 gram mol or greater of titanium compound.

6. The catalyst component of claim 3 wherein the magnesium compound, halogenated hydrocarbon and titanium compound are brought into contact in the ratio of about 1:0.0.1–20:0.1–10 on a mole basis.

7. The catalyst component of claim 1 wherein the titanium compound is represented by the formula Ti$^n$-(OR")$_x$(X)$_y$ wherein R" is an alkyl or aryl group having from 1 to 6 carbon atoms, X is chloride or bromide, n is 2, 3 or 4 and the sum of x+y is n.

8. The catalyst component of claim 1 wherein the halogenated hydrocarbon is a mono-or polyhalogenated saturated hydrocarbon having 2 or 3 carbon atoms.

9. A catalyst for the polymerization of olefins comprising the catalyst component of claim 1 and an organoaluminum compound represented by the formula R'''$_n$AlX$_{3-n}$, wherein R''' is an alkyl or aryl group, X is a halogen, alkoxy group or hydrogen and n is in the range of $1 \leq n \leq 3$.

10. A catalyst for the polymerization of olefins comprising the catalyst component of claim 2 and organoaluminum compound represented by the formula R'''$_n$AlX$_{3-n}$, wherein R''' is an alkyl or aryl group, X is a halogen, alkoxy group or hydrogen and n is in the range of $1 \leq n \leq 3$.

11. A catalyst for the polymerization of olefins comprising the catalyst component of claim 3 and organoaluminum compound represented by the formula R'''$_n$AlX$_{3-n}$, wherein R''' is an alkyl or aryl group, X is a halogen, alkoxy group or hydrogen and n is in the range of $1 \leq n \leq 3$.

12. A catalyst for the polymerization of olefins comprising the catalyst component of claim 4 and organoaluminum compound represented by the formula R'''$_n$AlX$_{3-n}$, wherein R''' is an alkyl or aryl group, X is a halogen, alkoxy group or hydrogen and n is in the range of $1 \leq n \leq 3$.

13. A catalyst for the polymerization of olefins comprising the catalyst component of claim 5 and organoaluminum compound represented by the formula R'''$_n$AlX$_{3-n}$, wherein R''' is an alkyl or aryl group, X is a halogen, alkoxy group or hydrogen and n is in the range of $1 \leq n \leq 3$.

14. A catalyst for the polymerization of olefins comprising the catalyst component of claim 6 and organoaluminum compound represented by the formula R'''$_n$AlX$_{3-n}$, wherein R''' is an alkyl or aryl group, X is a halogen, alkoxy group or hydrogen and n is in the range of $1 \leq n \leq 3$.

15. A catalyst for the polymerization of olefins comprising the catalyst component of claim 7 and organoaluminum compound represented by the formula R'''$_n$AlX$_{3-n}$, wherein R''' is an alkyl or aryl group, X is a halogen, alkoxy group or hydrogen and n is in the range of $1 \leq n \leq 3$.

16. A catalyst for the polymerization of olefins comprising the catalyst component of claim 8 and organoaluminum compound represented by the formula R'''$_n$AlX$_{3-n}$, wherein R''' is an alkyl or aryl group, X is a halogen, alkoxy group or hydrogen and n is in the range of $1 \leq n \leq 3$.

17. A catalyst component for use in the polymerization of ethylene which is obtained by contacting a magnesium compound represented by the formula Mg(OR)(OR'), a halogenated aliphatic hydrocarbon having 2 or more carbon atoms and titanium tetrachloride, wherein R and R' are alkyl, alkenyl, cycloalkyl, aryl and aralkyl groups and R and R' may be the same or different.

18. A catalyst component in accordance with claim 17 wherein the magnesium compound is contacted with magnesium dichloride.

19. The catalyst component of claim 18 wherein the magnesium compound, magnesium halide and halogenated hydrocarbon are ball-milled simultaneously.

20. The catalyst component of claim 8 wherein the halogenated hydrocarbon is hexachloroethane.

21. The catalyst component of claim 17 wherein the halogenated aliphatic hydrocarbon is hexachloroethane.

* * * * *